US011685851B2

(12) United States Patent
Shin et al.

(10) Patent No.: US 11,685,851 B2
(45) Date of Patent: Jun. 27, 2023

(54) COMPOSITE MATERIAL

(71) Applicant: LG CHEM, LTD., Seoul (KR)

(72) Inventors: Jong Min Shin, Daejeon (KR); Dong Woo Yoo, Daejeon (KR); So Jin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 189 days.

(21) Appl. No.: 16/646,830

(22) PCT Filed: Sep. 14, 2018

(86) PCT No.: PCT/KR2018/010848
§ 371 (c)(1),
(2) Date: Mar. 12, 2020

(87) PCT Pub. No.: WO2019/054799
PCT Pub. Date: Mar. 21, 2019

(65) Prior Publication Data
US 2020/0270501 A1    Aug. 27, 2020

(30) Foreign Application Priority Data
Sep. 15, 2017  (KR) .................. 10-2017-0118736

(51) Int. Cl.
*C09K 5/14*        (2006.01)
*B05D 7/14*        (2006.01)

(52) U.S. Cl.
CPC ................ *C09K 5/14* (2013.01); *B05D 7/148* (2013.01)

(58) Field of Classification Search
CPC .................................. C09K 5/14; B05D 7/148
USPC ........................................................ 428/213
See application file for complete search history.

(56) References Cited

U.S. PATENT DOCUMENTS

| | | | | |
|---|---|---|---|---|
| 2011/0155662 A1* | 6/2011 | Liu | ................... | B01D 69/06 |
| | | | | 264/43 |
| 2011/0311767 A1* | 12/2011 | Elahee | .................. | C08L 83/04 |
| | | | | 252/78.3 |
| 2014/0116661 A1* | 5/2014 | Xu | ..................... | B23P 15/26 |
| | | | | 29/890.03 |
| 2015/0223288 A1* | 8/2015 | Esseghir | ........... | H04W 88/085 |
| | | | | 420/528 |
| 2015/0236391 A1 | 8/2015 | Esseghir | | |
| 2016/0107376 A1 | 4/2016 | Nakajima et al. | | |
| 2017/0279113 A1* | 9/2017 | Ohsawa | ............ | H01M 50/461 |
| 2018/0162098 A1* | 6/2018 | Joo | ........................ | B32B 9/007 |
| 2020/0270409 A1 | 8/2020 | Shin et al. | | |

FOREIGN PATENT DOCUMENTS

| | | | | |
|---|---|---|---|---|
| CN | 102917574 A | 2/2013 | | |
| CN | 104204302 A | 12/2014 | | |
| CN | 104822476 A | 8/2015 | | |
| CN | 105339166 A | 2/2016 | | |
| CN | 106356343 A | 1/2017 | | |
| EP | 3174375 A1 * | 5/2017 | ............ | B32B 15/02 |
| EP | 3683045 A1 | 7/2020 | | |
| EP | 3686001 A1 | 7/2020 | | |
| JP | 2951327 B1 | 9/1999 | | |
| JP | 2000101005 | 4/2000 | | |
| JP | 2003080629 A | 3/2003 | | |
| JP | 2006056205 A | 3/2006 | | |
| JP | 2014534645 | 12/2014 | | |
| JP | 2015520294 A | 7/2015 | | |
| JP | 2016503575 A | 2/2016 | | |
| JP | 2016184648 A * | 10/2016 | ............... | H05K 7/20 |
| JP | 2017028019 | 2/2017 | | |
| KR | 200427596 Y1 | 9/2006 | | |
| KR | 1020070079891 | 8/2007 | | |
| KR | 100969194 | 7/2010 | | |
| KR | 1020100075227 | 7/2010 | | |
| KR | 1020130068436 | 6/2013 | | |
| KR | 101321099 B1 | 10/2013 | | |
| KR | 101476744 | 12/2014 | | |
| KR | 20150060725 A | 6/2015 | | |
| KR | 20170029376 A | 3/2017 | | |
| WO | 2020005014 A1 | 1/2020 | | |

OTHER PUBLICATIONS

Machine_English_translation_JP_2016184648_A; Nishimura, et al.; Heat Sink and Electronic Apparatus; Oct. 20, 2016; EPO; whole document (Year: 2016).*
International Search Report corresponding to PCT/KR2018/010848; dated Jan. 2, 2019 (5 pages, including English translation).
Yuming, Zhang , et al., "Research on New Type Graphite Fiber Reinforced All-base Composite Materials for Electronic Packaging", Intellectual Property Press. (6 pages, including English abstract), 2017.
Extended European Search Report corresponding to EP 18855371. 3; dated Aug. 20, 2020 (6 pages).

* cited by examiner

*Primary Examiner* — Tahseen Khan
(74) *Attorney, Agent, or Firm* — Myers Bigel, P.A.

(57) ABSTRACT

The present application provides a composite material and a method for preparing the same. The present application can provide a composite material which comprises a metal foam, a polymer component and a thermally conductive filler, and has other excellent physical properties such as impact resistance, processability and insulation properties while having excellent thermal conductivity.

13 Claims, No Drawings

COMPOSITE MATERIAL

CROSS REFERENCE TO RELATED APPLICATIONS

This application is a 35 U.S.C. § 371 national stage application of PCT International Application No. PCT/KR2018/010848, filed Sep. 14, 2018, which claims priority from Korean Patent Application No. 10-2017-0118736, filed Sep. 15, 2017, the contents of which are incorporated herein in their entireties by reference. The above-referenced PCT International Application was published in the Korean language as International Publication No. WO 2019/054799 on Mar. 21, 2019.

TECHNICAL FIELD

The present application relates to a composite material.

BACKGROUND ART

Heat-dissipating materials can be used in various applications. For example, since batteries and various electronic apparatuses generate heat during operation, a material capable of effectively controlling such heat is required.

As materials having good heat dissipation properties, ceramic materials having good thermal conductivity and the like are known, but since such materials have poor processability, a composite material produced by blending the ceramic filler or the like exhibiting high thermal conductivity in a polymer matrix can be used.

However, since a large amount of filler components must be applied in order to secure high thermal conductivity by the above method, various problems arise. For example, in the case of a material containing a large amount of filler components, the material itself tends to become hard, and in such a case, impact resistance or the like is deteriorated.

DISCLOSURE

Technical Problem

The present application relates to a composite material and in one example, it is intended to provide a composite material ensuring other excellent physical properties such as impact resistance and processability while having excellent thermal conductivity, or a method for producing the same.

Technical Solution

The present application relates to a composite material. In the present application, the term composite material may mean a material comprising at least a metal foam and a polymer component.

In this specification, the term metal foam or metal skeleton means a porous structure comprising a metal or a metal alloy as a main component. Here, the fact that a metal or the like uses as a main component means that the ratio of the metal or the like is 55 weight % or more, 60 weight % or more, 65 weight % or more, 70 weight % or more, 75 weight % or more, 80 weight % or more, 85 weight % or more, 90 weight % or more, or 95 weight % or more based on the total weight of the metal foam or the metal skeleton. The upper limit of the ratio of the metal or the like contained as the main component is not particularly limited, and for example, may be 100 weight %, 99 weight % or 98 weight % or so.

In this specification, the term porous property may mean a case where porosity is at least 10% or more, 20% or more, 30% or more, 40% or more, 50% or more, 60% or more, 70% or more, 75% or more, or 80% or more. The upper limit of the porosity is not particularly limited, and may be, for example, less than about 100%, about 99% or less, or about 98% or less or so. The porosity can be calculated in a known manner by calculating the density of the metal foam or the like.

The composite material has high thermal conductivity, and accordingly, it can be used as a material for controlling heat, such as a heat-dissipating material.

For example, the composite may have thermal conductivity of about 0.4 W/mK or more, 0.45 W/mK or more, 0.5 W/mK or more, 0.55 W/mK or more, 0.6 W/mK or more, 0.65 W/mK or more, 0.7 W/mK or more, 0.75 W/mK or more, 0.8 W/mK or more, 0.85 W/mK or more, 0.9 W/mK or more, 0.95 W/mK or more, 1 W/mK or more, 1.5 W/mK or more, 2 W/mK or more, 2.5 W/mK or more, 3 W/mK or more, 3.5 W/mK or more, 4 W/mK or more, 4.5 W/mK or more, 5 W/mK or more. The higher the thermal conductivity of the composite material, the composite material may have more excellent thermal control functions, which is not particularly limited, and in one example, it may be about 100 W/mK or less, 90 W/mK or less, 80 W/mK or less, 70 W/mK or less, 60 W/mK or less, 50 W/mK or less, 40 W/mK or less, 30 W/mK or less, 20 W/mK or less, or 15 W/mK or less. The method of measuring the thermal conductivity is not particularly limited, which can be measured by, for example, the method described in the following examples.

In addition, the thermal conductivity of the composite material referred to in this specification is measured according to the description method of Examples to described below.

Among physical properties mentioned in this specification, when the measured temperature affects relevant physical properties, the physical properties are physical properties measured at room temperature, unless otherwise specified. The term room temperature is a natural temperature without being heated or cooled, which may be, for example, any temperature in a range of 10° C. to 30° C., or a temperature of about 23° C. or about 25° C. or so.

While the composite material of the present application has excellent heat conduction properties as above, other properties such as processability and impact resistance can be stably secured, and such effects can be achieved by the contents described in this specification.

The shape of the metal foam contained in the composite material is not particularly limited, but may be a film shape in one example. In the composite material of the present application, a polymer component existing at least on the surface or in the interior of the metal foam in the film form is added.

Such a polymer component may form a surface layer on at least one surface of the metal foam, or may be filled and present in the voids inside the metal foam, and in some cases, it may also be filled into the metal foam while forming the surface layer. In the case of forming a surface layer, the polymer component may form the surface layer on at least one surface, some surfaces, or all surfaces among surfaces of the metal foam. In one example, the polymer component may form the surface layer on at least the upper and/or lower surfaces, which are the main surfaces of the metal foam. The surface layer may be formed to cover the entire surface of the metal foam, or may also be formed to cover only a part of the surface.

The metal foam in the composite material may have porosity in a range of about 10% to 99%. The metal foam having this porosity has a porous metal framework forming a suitable heat transfer network, and thus it can ensure excellent thermal conductivity even if a small amount of the relevant metal foam is applied. In another example, the porosity may be 15% or more, 20% or more, 25% or more, 30% or more, 35% or more, 40% or more, 45% or more, or 50% or more, or may be 98% or less.

As described above, the metal foam may be in the form of a film. In this case, the thickness of the film can be adjusted in consideration of the desired thermal conductivity or thickness ratio, and the like, in manufacturing a composite material according to a method to be described below. In order to ensure the target thermal conductivity, the thickness of the film may be, for example, about 10 μm or more, about 20 μm or more, about 30 μm or more, about 40 μm or more, about 45 μm or more, about 50 μm or more, about 55 μm or more, about 60 μm or more, about 65 μm or more, or about 70 μm or more. The upper limit of the thickness of the film is controlled according to the purpose, which is not particularly limited, but may be, for example, about 1,000 μm or less, about 900 μm or less, about 900 μm or less, about 800 μm or less, about 700 μm or less, about 600 μm or less, about 500 μm or less, about 400 μm or less, about 300 μm or less, about 200 μm or less, or about 150 μm or less or so.

In this specification, when the thickness of the relevant target is not constant, the thickness may be a minimum thickness, a maximum thickness or an average thickness of the target.

The metal foam may be a material having high thermal conductivity. In one example, the metal foam may comprise or consist of a metal or a metal alloy having thermal conductivity of about 8 W/mK or more, about 10 W/mK or more, about 15 W/mK or more, about 20 W/mK or more, about 25 W/mK or more, about 25 W/mK or more, about 30 W/mK or more, about 35 W/mK or more, about 40 W/mK or more, about 45 W/mK or more, about 50 W/mK or more, about 60 W/mK or more, about 70 W/mK or more, about 75 W/mK or more, about 80 W/mK or more, about 85 W/mK or more, or about 90 W/mK or more. The thermal conductivity is not particularly limited, which may be, for example, about 1,000 W/mK or less or so, because the higher the numerical value, the desired thermal control characteristics can be ensured while applying a small amount of the metal foam.

The skeleton of the metal foam may be composed of various kinds of metals or metal alloys, where a material capable of exhibiting thermal conductivity in the above-mentioned range may be selected from these metals or metal alloys. Such a material can be exemplified by any metal selected from the group consisting of copper, gold, silver, aluminum, nickel, iron, cobalt, magnesium, molybdenum, tungsten and zinc, or an alloy of two or more thereof, and the like, but is not limited thereto.

Such metal foams are variously known, and also various methods for preparing metal foams are variously known. In the present application, such known metal foams or metal foams prepared by the known methods can be applied.

As a method for preparing a metal foam, a method of sintering a pore-forming agent such as a salt and a composite material of a metal, a method of coating a metal on a support such as a polymer foam and sintering it in this state or a slurry method, and the like is known. Furthermore, the metal foam can also be prepared by a method disclosed in Korean Patent Application No. 2017-0086014, 2017-0040971, 2017-0040972, 2016-0162154, 2016-0162153 or 2016-0162152, and the like, which is a prior application of the present applicant.

The metal foam may also be prepared by the induction heating method from the methods described in the prior applications, where the metal foam may comprise at least a conductive magnetic metal. In this case, the metal foam may comprise 30 weight % or more, 35 weight % or more, 40 weight % or more, 45 weight % or more, or 50 weight % or more of the conductive magnetic metal on the basis of weight. In another example, the ratio of the conductive magnetic metal in the metal foam may be about 55 weight % or more, 60 weight % or more, 65 weight % or more, 70 weight % or more, 75 weight % or more, 80 weight % or more, 85 weight % or more, or 90 weight % or more. The upper limit of the ratio of the conductive magnetic metal is not particularly limited, and may be, for example, less than about 100 weight % or 95 weight % or less.

In the present application, the term conductive magnetic metal is a metal having predetermined relative magnetic permeability and conductivity, which may mean a metal capable of generating heat to such an extent that the metal can be sintered by the induction heating method.

In one example, as the conductive metal, a metal having relative magnetic permeability of 90 or more may be used. The relative magnetic permeability ($\mu_r$) is a ratio ($\mu/\mu_0$) of the magnetic permeability ($\mu$) of the relevant material to the magnetic permeability ($\mu_0$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated at the time of application of the electromagnetic field for induction heating which is described below, whereby the upper limit is not particularly limited. In one example, the upper limit of the relative magnetic permeability may be, for example, about 300,000 or less.

The conductive magnetic metal may have conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and for example, the conductivity may be about 30 MS/m or less, 25 MS/m or less, or 20 MS/m or less.

A specific example of such a conductive magnetic metal includes nickel, iron or cobalt, and the like, but is not limited thereto.

The composite material further comprises a polymer component present on the surface of the metal foam or in the interior of the metal foam, as described above, wherein the ratio (T/MT) of the total thickness (T) of such a composite material to the thickness (MT) of the metal foam may be 3 or less or 2.5 or less. In another example, the thickness ratio may be about 2 or less, 1.5 or less, 1.4 or less, 1.3 or less, 1.2 or less, 1.15 or less, or 1.1 or less. The lower limit of the thickness ratio is not particularly limited, but in one example, it may be about 1 or more, about 1.01 or more, about 1.02 or more, about 1.03 or more, about 1.04 or more, or about 1.05 or more. Under such a thickness ratio, it is possible to provide a composite material having excellent processability or impact resistance, and the like, while ensuring the desired thermal conductivity.

The kind of the polymer component included in the composite material of the present application is not particularly limited, which may be selected in consideration of, for example, processability, impact resistance, insulation properties or the like of the composite material. An example of the polymer component applicable in the present application may include one or more selected from the group consisting of known acrylic resins, silicone resins, epoxy resins, urethane resins, amino resins, and phenol resins, but is not limited thereto.

In the case of the composite material, it is possible to secure excellent thermal conductivity while minimizing the ratio of components securing the thermal conductivity mainly through the application of the above-described metal foam, thereby securing the desired physical properties without damaging processability or impact resistance, and the like.

In one example, the ratio (MV/PV) of the volume (PV) of the polymer component and the volume (MV) of the metal foam contained in the composite material may be 10 or less. In another example, the ratio (MV/PV) may be 9 or less, 8 or less, 7 or less, 6 or less, 5 or less, 4 or less, 3 or less, 2 or less, 1 or less, or 0.5 or less or so. The lower limit of the volume ratio is not particularly limited, which may be, for example, about 0.1 or so. The volume ratio can be calculated through the weight of the polymer component and the metal foam, included in the composite material, and the density of the relevant components.

In the composite material of the present invention, such a polymer component forms a surface layer on at least one surface of the metal foam, where a thermally conductive filler is contained in the surface layer. Through this, it is possible to provide a composite material having better heat conduction characteristics.

The term thermally conductive filler in the present application means a filler having thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the thermally conductive filler is not particularly limited, and for example, a ceramic filler or a carbon-based filler, and the like can be applied. Such a filler can be exemplified by alumina, aluminum nitride (AlN), boron nitride (BN), silicon nitride, silicon carbide (SiC) or beryllium oxide (BeO), and the like, or a filler such as carbon nanotube or graphite, but is not limited thereto.

The shape or ratio of the filler included in the surface layer is not particularly limited. In one example, the shape of the filler may have various shapes such as a substantially spherical shape, a needle shape, a plate shape, a dendritic shape or a star shape, but is not particularly limited to the shape.

In one example, the thermally conductive filler may have an average particle diameter in a range of 0.001 µm to 80 µm. In another example, the average particle diameter of the filler may be 0.01 µm or more, 0.1 or more, 0.5 µm or more, 1 µm or more, 2 µm or more, 3 µm or more, 4 µm or more, 5 µm or more, or about 6 µm or more. In another example, the average particle diameter of the filler may be about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 5 µm or less.

The ratio of the filler can be adjusted within the range in which the desired properties are secured or undamaged. In one example, the filler may be included in the composite material in a volume ratio of about 80 vol % or less. Here, the volume ratio is a value calculated based on the weight and density of each of the components constituting the composite material, for example, the metal foam, the polymer component and the filler.

In another example, the volume ratio may be about 75 vol % or less, 70 vol % or less, 65 vol % or less, 60 vol % or less, 55 vol % or less, 50 vol % or less, 45 vol % or less, 40 vol % or less, 35 vol % or less, or about 30 vol % or less or so, or may be about 1 vol % or more, 2 vol % or more, 3 vol % or more, 4 vol % or more, or about 5 vol % or more or so.

The present application also relates to a method for preparing a composite material in the form as above. The method may comprise a step of curing a curable polymer composition comprising a thermally conductive filler in a state where the polymer composition is present on the surface of a metal foam comprising a metal or a metal alloy having thermal conductivity of 8 W/mK or more and being in the form of a film.

The details of the metal foam or filler applied in the method are as described above, and specific matters of the composite material to be prepared may also follow the contents as described above.

On the other hand, the polymer composition applied in the above is not particularly limited as long as it can form the above-mentioned polymer component through curing or the like, and such polymer components are variously known in the art.

That is, for example, the composite material can be prepared by performing the curing through a known method using a material having appropriate viscosity among known components.

Advantageous Effects

The present application can provide a composite material which comprises a metal foam, a polymer component and a thermally conductive filler, and has other excellent physical properties such as impact resistance, processability and insulation properties while having excellent thermal conductivity.

MODE FOR INVENTION

Hereinafter, the present application will be described in detail by way of examples and comparative examples, but the scope of the present application is not limited to the following examples.

Example 1

The metal foam was a copper metal foam, where the copper foam in a film shape with a thickness of about 70 µm or so and porosity of about 70% or so was used. The copper metal foam was impregnated with a thermosetting epoxy resin composition comprising a thermosetting epoxy compound (Kukdo Chemical Co., Ltd., YD128) and a curing agent (Kukdo Chemical Co., Ltd., G640), and further comprising a thermally conductive filler (alumina powder (plate shape, average particle diameter: width and height lengths: about 20 to 30 thickness: about 1 to 3 μm) in a ratio of about 30 weight %, and an excess of composition was removed using an applicator so that the thickness of the final composite material was about 120 μm or so. Subsequently, the material was maintained in an oven at about 80° C. for about 1 hour or so and cured to prepare a composite material. As a result of being calculated based on the density and the applied weight of each of the applied polymer component (epoxy resin), metal foam (copper metal foam) and thermally conductive filler, the ratio (MV/PV) of the volume (PV) of the polymer component and the volume (MV) of the metal foam was about 0.2 or so and the volume ratio of the thermally conductive filler in the composite material was about 24% or so. The thermal conductivity of the composite material was about 0.501 W/mK or so.

The thermal conductivity was determined by obtaining the thermal diffusivity (A), specific heat (B) and density (C) of the composite material and substituting them into an equation of thermal conductivity=ABC, where the thermal diffusivity was measured with a laser flash method (LFA equipment, model name: LFA467), the specific heat was measured by way of DSC (differential scanning calorimeter) equipment and the density was measured with Archimedes method. Also, the thermal conductivity is a value with respect to the thickness direction (Z axis) of the composite material.

Example 2

A composite material was prepared in the same manner as in Example 1, except that spherical alumina powder (average particle diameter: about 10 μm) was used as the thermally conductive filler. As a result of being calculated based on the density and the applied weight of each of the applied polymer component (epoxy resin), metal foam (copper metal foam) and thermally conductive filler, the ratio (MV/PV) of the volume (PV) of the polymer component and the volume (MV) of the metal foam was about 0.2 or so and the volume ratio of the thermally conductive filler in the composite material was about 24% or so. In addition, the thermal conductivity of the composite material was about 0.412 W/mK or so.

Example 3

A composite material was prepared in the same manner as in Example 1, except that a polymer composition comprising, as the thermally conductive filler, plate shaped-boron nitride powder (plate shape, average particle diameter: width and height lengths: about 20 to 30 μm, thickness: about 1 to 3 μm) in an amount of about 10 weight % was used. As a result of being calculated based on the density and the applied weight of each of the applied polymer component (epoxy resin), metal foam (copper metal foam) and thermally conductive filler, the ratio (MV/PV) of the volume (PV) of the polymer component and the volume (MV) of the metal foam was about 0.2 or so and the volume ratio of the thermally conductive filler in the composite material was about 8% or so. In addition, the thermal conductivity of the composite material was about 1.758 W/mK or so.

Example 4

A composite material was prepared in the same manner as in Example 1, except that a thermosetting silicone composition (PDMS, Sylgard 183 kit) comprising plate-shaped boron nitride powder (plate shape, average particle diameter: width and height lengths: about 20 to 30 μm, thickness: about 1 to 3 μm) in an amount of about 5 weight % was used as the polymer composition, and the curing process was performed in an oven at 120° C. for about 10 minutes (final composite thickness: about 120 μm or so). As a result of being calculated based on the density and the applied weight of each of the applied polymer component (silicone resin), metal foam (copper metal foam) and thermally conductive filler, the ratio (MV/PV) of the volume (PV) of the polymer component and the volume (MV) of the metal foam was about 0.2 or so and the volume ratio of the thermally conductive filler in the composite material was about 8% or so. In addition, the thermal conductivity of the composite material was about 2.55 W/mK or so.

Example 5

The metal foam was a copper metal foam, where the copper foam in a film shape with a thickness of about 70 μm or so and porosity of about 70% or so was used. The copper metal foam was impregnated with a thermosetting silicone composition (PDMS, Sylgard 527 kit) comprising boron nitride powder (plate shape, average particle diameter: width and height lengths: about 20 to 30 μm, thickness: about 1 to 3 μm) in a ratio of about 10 weight %, and an excess of composition was removed using an applicator so that the thickness of the final composite material was about 100 μm or so. Subsequently, the material was maintained in an oven at about 120° C. for about 90 minutes or so and cured to prepare a composite material. As a result of being calculated based on the density and the applied weight of each of the applied polymer component (silicone resin), metal foam (copper metal foam) and thermally conductive filler, the ratio (MV/PV) of the volume (PV) of the polymer component and the volume (MV) of the metal foam was about 0.25 or so and the volume ratio of the thermally conductive filler in the composite material was about 8% or so. As a result of measuring the thermal conductivity of this composite material in the above-mentioned manner, it was about 6.670 W/mK.

Example 6

A composite material was prepared in the same manner as in Example 5, except that the thickness of the final composite material was about 80 μm or so. As a result of being calculated based on the density and the applied weight of each of the applied polymer component (silicone resin), metal foam (copper metal foam) and thermally conductive filler, the ratio (MV/PV) of the volume (PV) of the polymer component and the volume (MV) of the metal foam was about 0.34 or so and the volume ratio of the thermally conductive filler in the composite material was about 8% or so. As a result of measuring the thermal conductivity of this composite material in the above-mentioned manner, it was about 10.401 W/mK.

Comparative Example 1

The polymer composition applied in Example 1 was cured alone to form a film having a thickness of about 120 μm or so. The thermal conductivity of the formed film was about 0.199 W/mK.

Comparative Example 2

The polymer composition applied in Example 2 was cured alone to form a film having a thickness of about 120 μm or so. The thermal conductivity of the formed film was about 0.270 W/mK.

What is claimed is:

1. A composite material comprising:
   a metal foam, said metal foam in the form of a film; and
   a polymer on a surface of the metal foam,
   wherein the polymer forms a surface layer on the surface of the metal foam,
   wherein the polymer comprises a thermally conductive filler,
   wherein the metal foam has a thickness of 10 to 1,000 μm,
   wherein the total thickness (T) of the composite material is at most 3 times the thickness (MT) of the metal foam,
   wherein the volume (MV) of the metal foam is 0.25 to 1 times the volume (PV) of the polymer,
   wherein a volume of the thermally conductive filler is at most 30 vol % of the composite material,
   wherein the thermally conductive filler has a needle shape, a plate shape, a dendritic shape or a star shape, and
   wherein the thermal conductivity of the composite material is at least 3 W/mK as determined by calculating the thermal conductivity as equal to A×B×C, wherein A is the thermal diffusivity, B is the specific heat, and C is the density of the composite material.

2. The composite material according to claim 1, wherein the total thickness (T) of the composite material is at most 2.5 times the thickness (MT) of the metal foam.

3. The composite material according to claim 1, wherein the total thickness (T) of the composite material is at least 1.1 times the thickness (MT) of the metal foam.

4. The composite material according to claim 1, wherein the metal foam comprises a metal or a metal alloy having a thermal conductivity of at least 8 W/mK.

5. The composite material according to claim 1, wherein the metal foam has porosity in a range of from 10 to 99%.

6. The composite material according to claim 1, wherein the metal foam has a skeleton comprising a metal selected from the group consisting of copper, gold, silver, aluminum, nickel, iron, cobalt, magnesium, molybdenum, tungsten, zinc, and combinations of two or more thereof.

7. The composite material according to claim 1, wherein the polymer comprises one or more selected from the group consisting of an acrylic resin, a silicone resin, an epoxy resin, a urethane resin, an amino resin and a phenol resin.

8. The composite material according to claim 1, wherein the thermally conductive filler is a ceramic filler or a carbon filler.

9. The composite material according to claim 1, wherein the thermally conductive filler is alumina, aluminum nitride (AlN), boron nitride (BN), silicon nitride, silicon carbide (SiC), beryllium oxide (BeO), carbon nanotube or graphite.

10. The composite material according to claim 1, wherein the thermally conductive filler has an average particle diameter in a range of from 0.001 μm to 80 μm.

11. A method for preparing the composite material of claim 1, comprising a step of curing a curable polymer composition containing a thermally conductive filler onto a surface of a metal foam, said metal foam comprising a metal or a metal alloy with a thermal conductivity of at least 8 W/mK, and said metal foam being in the form of a film.

12. The composite material of claim 1, further comprising the polymer in the interior of the metal foam.

13. The composite material according to claim 1, wherein the thermal conductivity of the composite material is at least 5 W/mK as determined by calculating the thermal conductivity as equal to A×B×C, wherein A is the thermal diffusivity, B is the specific heat, and C is the density of the composite material.

* * * * *